United States Patent
Liger

[11] Patent Number: 5,781,106
[45] Date of Patent: Jul. 14, 1998

[54] DEVICE AND METHOD FOR THE TELECONTROL OF AN OBJECT

[75] Inventor: René Liger, Limetz-Villetz, France

[73] Assignee: Inmed B.V., Re Delft, Netherlands

[21] Appl. No.: 793,296

[22] PCT Filed: Sep. 4, 1995

[86] PCT No.: PCT/FR95/01145

§ 371 Date: Mar. 11, 1997

§ 102(e) Date: Mar. 11, 1997

[87] PCT Pub. No.: WO96/08802

PCT Pub. Date: Mar. 21, 1996

[30] Foreign Application Priority Data

Sep. 16, 1994 [FR] France ................... 94 11095

[51] Int. Cl.$^6$ ............... G08B 26/00; H04Q 7/00
[52] U.S. Cl. ........... 340/505; 340/825.54; 340/928; 340/572; 340/825.31; 235/384; 342/51; 342/42
[58] Field of Search .................. 340/505, 506, 340/933, 825.54, 825.69, 825.72, 825.07, 825.13, 825.3, 825.31, 825.32, 825.34, 928, 572; 342/30, 42, 51; 235/384, 382.5, 382

[56] References Cited

U.S. PATENT DOCUMENTS

| | | | |
|---|---|---|---|
| 4,691,202 | 9/1987 | Denne et al. | 340/825.54 |
| 5,028,918 | 7/1991 | Giles et al. | 340/825.54 |
| 5,196,846 | 3/1993 | Brockelsby et al. | 340/825.54 |
| 5,351,052 | 9/1994 | D'Hont et al. | 342/42 |
| 5,552,789 | 9/1996 | Schuermann | 340/825.54 |
| 5,565,857 | 10/1996 | Lee | 340/825.34 |

FOREIGN PATENT DOCUMENTS

| | | |
|---|---|---|
| 0252773 | 1/1988 | European Pat. Off. |
| 94/08820 | 4/1994 | WIPO |

Primary Examiner—Donnie L. Crosland
Attorney, Agent, or Firm—Spencer & Frank

[57] ABSTRACT

A vehicle (V) is fitted with a primary receiver/emitter cell (1) containing a first code (C1) and a secondary receiver/emitter cell (2) containing a second code (C2) as well as a first representation (FR1) of the first code (C1). The two cells receive respectively primary (EIB1, EIA1) and secondary (EIB2) selective interrogations (OI) to which they respond by emitting respectively a primary response (ERB 1, ERA 1) representing the first code (C1) and a secondary response (ERB2) representing the second code (C2). Then the secondary cell (2) responds alone to a complementary interrogation (EIC) which contains a second representation (SR2) of the first and second codes emitted, together with an order.

16 Claims, 3 Drawing Sheets

DEVICE AND METHOD FOR THE TELECONTROL OF AN OBJECT

BACKGROUND OF THE INVENTION

The invention relates to the telecontrol of objects, and especially the telecontrol of the movement of automotive vehicles, for the purposes of producing an effective deterrent against theft and/or of allowing "transactions".

A transaction is understood to mean any type of collecting or dispatching of data with the aim of respectively receiving particulars originating from the interrogated object or of sending information to said object. This could involve, especially, checking the level of a battery, validating the toll for a car park or motorway, identifying an object, replacing a code stored in a rewritable memory, controlling the triggering of an alarm.

Various means are already known which are used as deterrent against the theft of automobiles. One of them consists in remotely reading one or more marks which are, carried by the vehicle and which are able to identify it.

Such devices comprise an interrogator unit capable of effecting a primary interrogation using waves so as selectively to interrogate at least one primary receiver/transmitter cell housed in or on said object and containing in primary storage means a first code, and of receiving from said primary cell a primary response able to represent a part at least of this first code.

A device of this type is known especially through French Patent No. 89 17133 (FR-A-2 656449), which describes a method for the control of the movement of objects, as well as the associated device. This device comprises at least one compulsory transitway equipped with a fixed transmitter/receiver reader forming an interrogator unit, connected to a station and at least one receiver/transmitter cell housed in or on the vehicle When a vehicle passes through the transitway above the interrogator unit, this prompts the transmission of an identification code common to all the cells installed in the vehicle. This identification code is received by the cell, which then compares it with the identification code which it contains in a memory of electrically programmable type. If the two codes are identical, the cell transmits toward the interrogator unit a signal dependent on its own identification code which is contained in a read only memory. The signal transmitted by the cell is then received by the interrogator unit, which forwards it to processing means which deduce the identification code of the vehicle therefrom, which they are then going to compare with the codes of the equipped vehicles, which are contained in files.

Such a solution offers good protection against frauds of mechanical type (destruction or shielding of the cell) when the cell is installed in an invisible manner in the vehicle.

However, this known solution does not make it possible to protect against certain electronic frauds since:
- firstly, the identification codes individual to the cells cannot be modified, given that they are contained in the read only memory of a cell to which access is made difficult, or even impossible, through its installation;
- secondly, given that the code transmitted by the interrogator unit is common to all the cells and that the codes individual to each cell are contained in a file, anybody having had access at a given instant to said file is in a position to make and install a replacement decoy on a given vehicle;
- thirdly, the interrogator unit can effect only a single interrogation consisting in obtaining the code individual to each cell, this precluding any transaction other than that of identification.

Moreover, the interrogator unit being fixed, such a solution does not make it possible to effect an identification just anywhere.

SUMMARY OF THE INVENTION

The present invention proposes a means of multiple transaction, and especially of anti-theft deterrent suitable for remedying the aforesaid drawbacks.

For this purpose it proposes a device of the type described earlier and furthermore comprising at least one secondary receiver/transmitter cell housed in or on said object and containing in secondary storage means a second code and a first representation of a part at least of the first code, and capable of transmitting, in response to a secondary interrogation, a secondary response able to represent a part at least of this second code, as well as of effecting, after a primary interrogation of the primary cell and a secondary interrogation of the secondary cell, at least one complementary response in response to a complementary interrogation effected by the interrogator unit, said complementary interrogation containing a second representation of a part at least of the first and second codes transmitted respectively by said primary and secondary cells in response to the primary and secondary interrogations.

This allows the secondary cell to effect a complementary response depending on the primary and secondary responses of the primary and secondary cells, respectively.

Thus, the identification of a vehicle by an interrogator unit necessarily involves the interrogation of two cells, one possibly visible and made in the form of a sticker affixed to the windscreen of the vehicle, the other being invisible on account of its installation inside said vehicle.

Additionally, such a device permits all sorts of remote transactions since the number of transmissions/receptions between the interrogator unit, which is not necessarily fixed, and one at least of the cells is not limited to 1.

According to another characteristic of the invention, the transmission/reception links between the interrogator unit and one at least of the cells are effected on at least four distinct frequencies. This allows the interrogator unit to store selectively the part at least of the first and second codes transmitted by the primary and secondary cells in response to the primary and secondary interrogations, depending on the frequencies of transmission of the primary and secondary responses of the cells.

Thus, the interrogation of a cell is carried out independently of the other cells, thus avoiding conflicts of information and appreciably restricting the possibilities of jamming.

This effect is further strengthened through the fact that the interrogations can be effected either electromagnetically, or inductively.

According to yet another characteristic of the invention, the complementary interrogation furthermore comprises a command area which includes a command to execute a "transaction". Moreover, in the event of absence of response of one at least of the primary and secondary cells, the second representation of the part at least of the absent code is replaced with a specific code declaring absence of said absent cell.

Thereby, the secondary cell can be apprised in a single complementary interrogation, on the one hand, of the transaction requested and, on the other hand, of the presence or absence of the first cell.

According to yet another characteristic of the invention, the secondary cell furthermore comprises processing means capable of comparing the codes of the primary and secondary cells, contained in these secondary storage means, with the second representation of the parts at least of the respective codes of the primary and secondary cells included within the complementary interrogation.

Thus, in a particularly advantageous manner, it is no longer the interrogator unit which effects verification of the codes of the cells by comparison with codes contained in a file, as is known, but it is the secondary cell which is housed in or on said object which henceforth effects said comparison.

Advantageously, the primary and secondary storage means are rewritable.

Thus, an interrogator unit situated in proximity to an object equipped with the cells according to the invention is also capable of modifying on command the first code contained in the primary storage means and its first representation in the secondary storage means, and/or the second code contained in the secondary storage means.

Consequently, the codes contained in each cell may be changed at any moment, thus appreciably limiting the possibilities for electronic fraud.

The invention also describes a method for the telecontrol of an object, in which in a known manner:

a) the object is furnished with at least one primary receiver/transmitter cell housed in or on said object and containing in primary storage means a first code, and capable of transmitting a primary response in response to a primary interrogation, and b) a primary selective interrogation using waves of this primary cell is undertaken, and a primary response able to represent a part at least of the first code is received from said primary cell.

The method according to the invention makes provision that:

in step a), there is provided at least one secondary receiver/transmitter cell housed in or on said object and containing in secondary storage means a second code and a first representation of a part at least of the first code, said secondary cell being capable of transmitting a secondary response in response to a secondary interrogation effected by the interrogator unit, and at least one complementary response in response to a complementary interrogation effected by said interrogator unit, in step b) a secondary selective interrogation using waves of the secondary cell is undertaken, and a secondary response able to represent a part at least of the second code is received from said secondary cell, and said method according to the invention furthermore includes:

a step c) in which there is transmitted to the secondary cell a complementary interrogation containing a second representation of a part at least of the first and second codes transmitted by said primary and secondary cells in step b), a step d) in which the secondary cell compares the second code and the first representation of a part at least of the first code, which are contained in its secondary storage means, with the second representation of the parts at least of the respective codes of the primary and secondary cells which are included within the complementary interrogation, and a step e) in which the secondary cell transmits at least a complementary response as a function of the complementary interrogation received in step c).

According to another aspect of the method according to the invention, in the event of at least partially unsuccessful comparison in step d), there is provision to recommence at least once steps b) to d), and to increment an incrementation counter housed in the secondary cell.

Moreover, the number of permitted repetitions of steps b) to d), in the event of at least partially unsuccessful comparison, is predetermined, thus triggering, in the event of the exceeding of said predetermined number, the transmission by the secondary spell of an alarm response.

Thus, in the event of malfunctioning or absence of one of the cells, and especially of the primary cell, the interrogator unit is apprised only in the event of confirmation of nonsuccess of steps b) to d), thus allowing it to alert either the possessor of the interrogator unit, or more directly a central station having a link with said interrogator unit.

Other characteristics and advantages of the invention will emerge on examining the detailed description below, and the appended drawings, in which:

DESCRIPTION OF THE PREFERRED EMBODIMENT(S)

Figure 1:
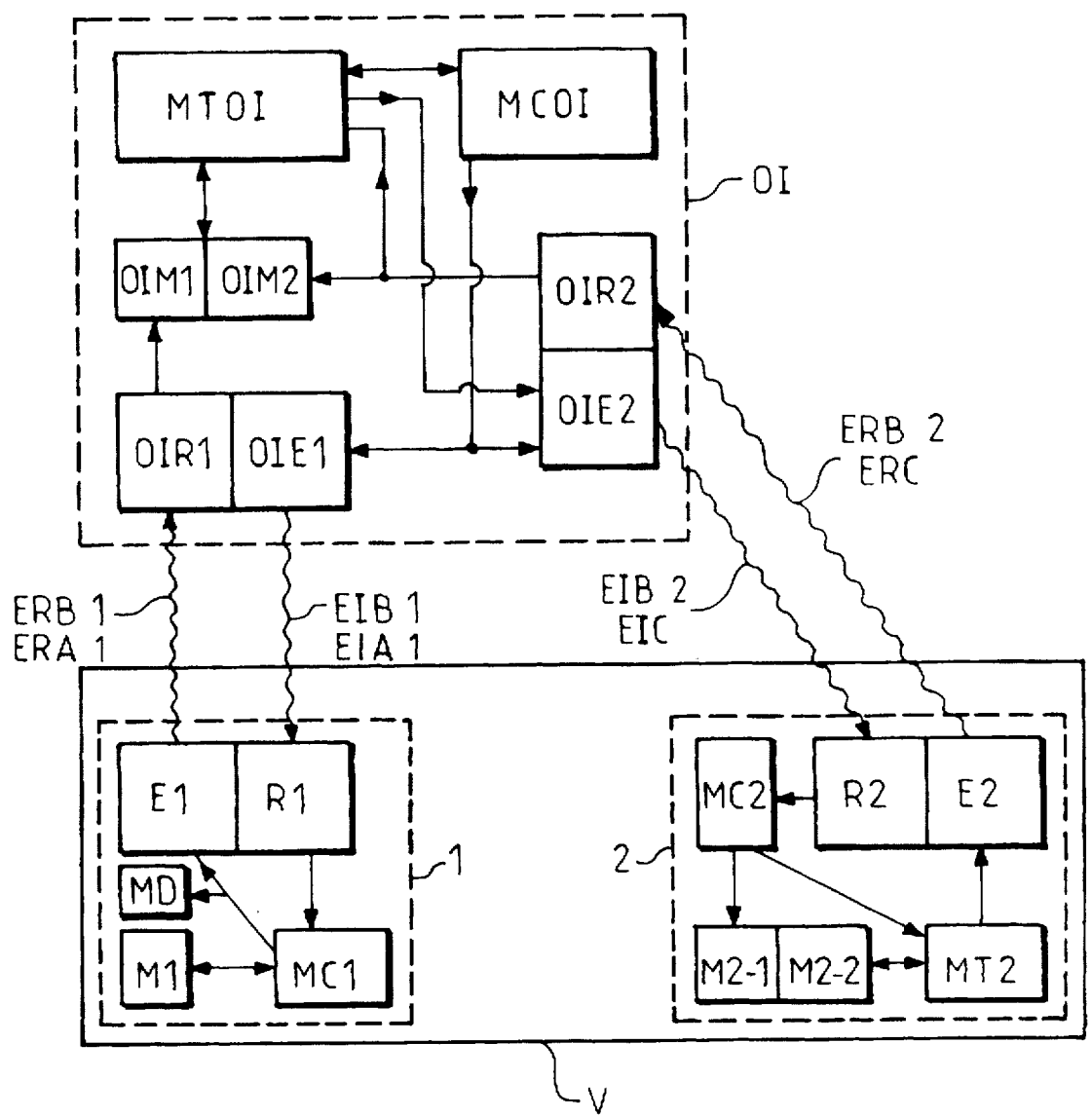
FIG. 1 is a diagram illustrating the links between the various elements making up the device.
Figure 2:
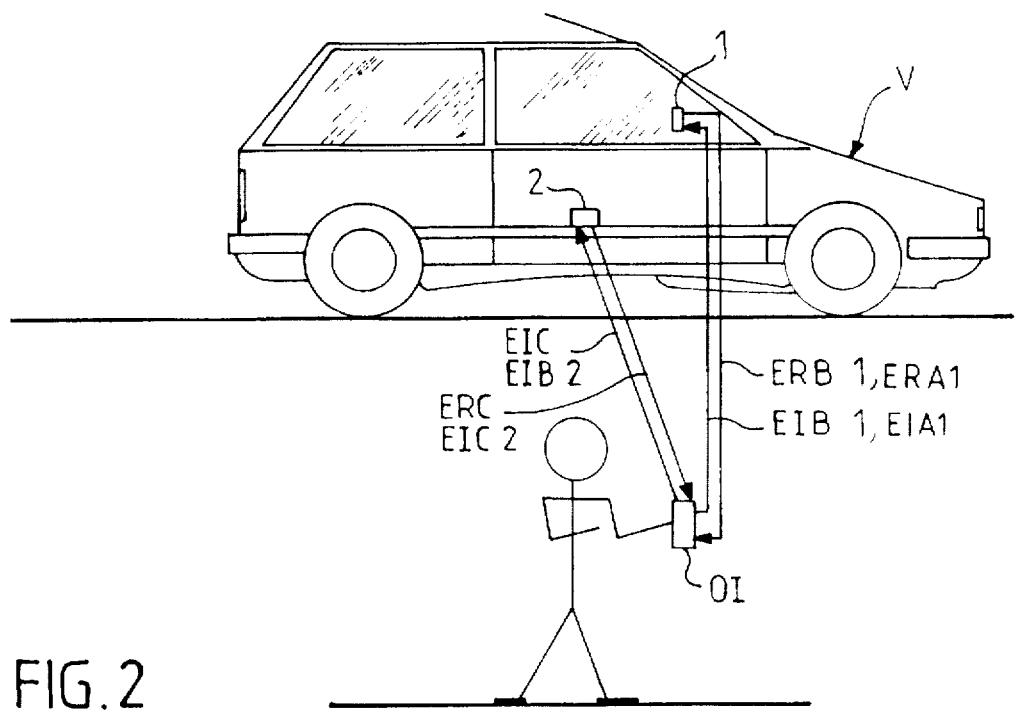
FIG. 2 is a basic diagram of a device implementing the invention.

Reference will first be made to FIGS. 1 and 2 in order to describe the main elements making up the device according to an embodiment of the invention.

In this embodiment, the device comprises a primary cell 1 and a secondary cell 2 which are housed in a vehicle V, and an interrogator unit OI suitable for remotely interrogating using waves the primary 1 and secondary 2 cells.

The primary cell 1 is for example made in the form of a sticker which is attached to the windscreen of the vehicle V.

It comprises a reception module R1 and a transmission module E1 for communicating with the interrogator unit OI, a primary control module MC1 suitable for performing predetermined operations in response to an interrogation of said interrogator unit OI, rewritable primary storage means M1 containing a first code C1 which is specific thereto, and a communication module MD1 for communicating with the driver of the vehicle V.

The primary control module MC1 contains a low voltage battery driven by a timeout circuit permitting two states: a standby state which consumes no energy, and an operating state for responding to an interrogation.

This primary module MC1, is connected firstly to the receiver part R1 of the reception/transmission module from which it receives the data, secondly to the primary storage means M1, thus allowing it either to extract the first code C1 therefrom or to carry out on command the replacement of said first code C1, thirdly to the transmitter part E1 of the reception/transmission module, thus allowing it to respond to an interrogation or to transmit an alarm if need be, and fourthly to the communication module MD1 which it notifies of problems in the event, for example, of poor reception during an interrogation of the primary cell 1, or of poor operation of one of the elements making up the primary cell 1.

Such a communication between MD1 and the driver can be effected by using a light-emitting diode or a buzzer.

The secondary cell 2 is for example made in the form of a package installed in the structure of the vehicle V, this rendering it invisible and hence protecting it from frauds of a mechanical type.

It comprises a reception module R2 and a transmission module E2 for communicating with the interrogator unit OI, a secondary control module MC2 suitable for performing predetermined operations in response to an interrogation of said interrogator unit OI, a processing module MT2 suitable for performing processings of data arising from the secondary control module MC2 and for effecting one or more responses in order to respond to an interrogation, and rewritable secondary storage means M2 containing in a first part M2-1 a first representation FR1 of a part at least of the first code C1 and in a second part M2-2 a second code C2 individual thereto.

The secondary control module MC1 contains a low voltage battery driven by a timeout circuit permitting two states: a standby state which consumes no energy, and an operating state for responding to an interrogation.

This secondary control module MC1 is connected firstly to the receiver part R2 of the receiver/transmitter module from which it receives the data, secondly to the secondary storage means M2, thus allowing it to perform therein the replacement on command of the second code C2 and/or of the first representation FR1 of the first code, and thirdly to the processing module MT2 to which it delivers commands and/or data arising from the receiver R2.

The processing module MT2 is also connected on the one hand to the secondary storage means M2, thus allowing it to extract therefrom the codes which they contain, and on the other hand to the transmitter part E2 of the reception/transmission module, thus allowing it to respond to the interrogations or to transmit an alarm if need be.

Each reception module of a cell R1 or R2 is made in such a way that it can receive transmissions effected electromagnetically or inductively.

The interrogator unit OI comprises a first transmission module OIE1 and reception module OIR1 for communicating with the primary cell 1, a second transmission module OIE2 and reception module OIR2 for communicating with the secondary cell 2, storage means OIM1 and OIM2 suitable for storing data arising respectively from the receiver parts OIR1 and OIR2, a control module MCOI suitable for controlling on command the interrogation of the primary 1 and secondary 2 cells, as well as of receiving data arising from a processing module MTOI which processes the data arising from the storage means OIM or from the receiver part OIR2 of the second transmission/reception module.

Each transmission module OIE1 and OIE2 is suitable for interrogating a cell electromagnetically or inductively.

The processing module MTOI is connected firstly to the receiver part OIR2 of the second transmission/reception module which provides it with the data to be processed arising directly from the secondary cell 2, secondly to the storage means OIM1 and OIM2, thus allowing it to extract therefrom the codes which they contain, thirdly to the control module MCOI, from which it receives predetermined commands permitting it to carry out a processing of data, and fourthly to the transmitter part OI2 of the second transmission/reception module in order to instruct interrogation of the secondary cell after certain processings.

The separation of the transmission/reception modules of the interrogator unit OI allows each cell 1 or 2 to communicate with said interrogator unit OI on frequencies which differ in transmission as in reception.

The primary cell 1 is capable of effecting a so-called "primary" response ERB1, ERA1 able to represent a part at least of the first code C1 which it contains, in response to a so-called "primary" interrogation effected by an interrogator unit OI. This code C1 will be able to contain for example 16 bits.

The secondary cell 2 is capable of effecting a secondary response ERB2 able to represent a part at least of the second code C2 which it contains, as well as at least one so-called "complementary" response, in response to a so-called "complementary" interrogation effected by an interrogator unit OI. This code C2 will be able to contain for example 16 bits.

A complementary interrogation comprises a second representation SR2 of a part at least of the first and second codes transmitted by the primary 1 and secondary 2 cells in response to the primary and secondary interrogations, as well as a command area containing a command to execute a "transaction".

The interrogations between the interrogator unit OI and the primary 1 and secondary 2 cells are effected for example at 125 kHz and 62.5 kHz respectively, whereas the responses between the primary 1 and secondary 2 cells and the interrogator unit OI are effected respectively, for example, at 225 MHz and 30.875 MHz.

In this way, the responses of each cell are selected directly by the receiver OIR whose frequency is centered on that of said response.

This particularly advantageous solution is certainly more cumbersome, but it has the advantage of rendering the links between cells independent, thus avoiding conflicts of information. Moreover, it enables the responses transmitted on different frequencies to be stored in different memories, without use of a filter, thus appreciably simplifying the processing of the data.

Figure 3:
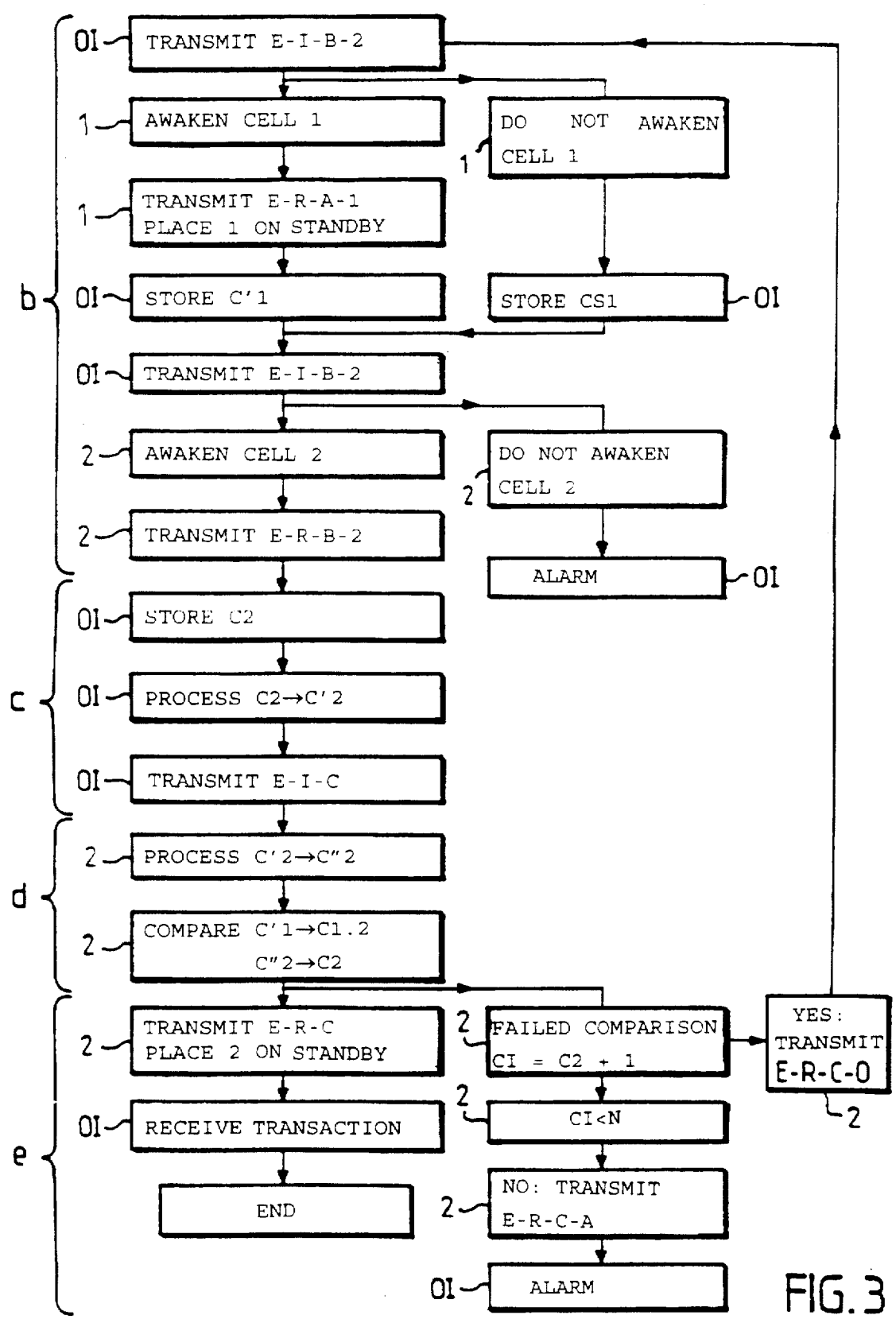
FIG. 3 is a flowchart illustrating the main steps of the communication protocol according to the invention.

In order to describe the telecontrol method according to the invention, reference is made to FIG. 3.

This method is divided into 5 steps:

a step a) in which the primary 1 and secondary 2 cells are set up in the vehicle V, the primary cell 1 containing a first specific code C1 in its primary memory M1, and the secondary cell 2 containing a second specific code C2 as well as a first representation FR1 of the first code C1 respectively in the second M2-2 and first M2-1 parts of its secondary memory M2;

a step b) in which the primary selective interrogation EIB1, EIA1 of the primary cell 1 is undertaken, followed by the secondary selective interrogation EIB2 of the secondary cell 2. The primary and secondary interrogations may either be simultaneous or successive.

Each cell responds to the primary or secondary interrogation by returning a primary or secondary response ERB1, ERA1 and ERB2 toward the interrogator unit OI which stores the code contained in each response in one of the memories, OIM1 or OIM2 depending on the frequency of said response;

a step c) in which the interrogator unit OI transmits to the secondary cell 2 a complementary interrogation OIC containing a second representation SR2 of a part at least of the first C1 and second C2 codes transmitted by said primary 1 and secondary 2 cells in step b);

a step d) in which the secondary cell 2 compares, by virtue of its processing module MT2, the second code C2 and the first representation FR1 which is contained in its secondary storage means respectively MZ-2 and M2-1, with the parts at least of the respective codes of the primary 1 and secondary 2 cells of the second representation SR2 received in step c).

a step e) in which the secondary cell 2 transmits at least one complementary response ERC depending on the comparison effected in step d) and on the command contained in the complementary interrogation EIC.

Steps b) to e) can be broken down as follows:

Step b):

Two types of commands may give rise to the interrogation of primary 1 and secondary 2 cells housed in a vehicle V: a command external to the interrogator unit OI, or an automatic procedure triggered by detecting the transit of said vehicle V.

Once warned, the control module MCOI of said interrogator unit OI then orders the transmitter part OIE1 of the first transmission/reception module to transmit a primary interrogation EIB1, EIA1 toward the primary cell 1. This primary interrogation EIB1, EIA1 consists of a for example amplitude-modulated (AM) carrier at 2280 Hz. However, phase-modulation or any other manner of modulation may also be employed.

The primary interrogation is carried out in two sub-steps. In a first step, a so-called "basic" primary interrogation EIB1 is transmitted so as to request the primary cell to return a part at least of the first code which it contains in its primary memory M1. If the strength of the signal is sufficient, and if the primary cell recognizes the carrier within a given time span, then the primary control module MC1 passes from the standby state to the operating state, this implementing a timeout circuit. The primary cell then has a first predetermined duration in which to respond.

Said primary control module MC1 extracts a part at least of the first code C1 contained in the primary memory M1, and then inserts these bits of the first code into a bit sequence. This sequence is forwarded to the transmitter part E1 of the reception/transmission module which forwards it using waves in the form of a basic primary response ERB1 to the interrogator unit OI. The latter receives ERB1, effects a predetermined processing of the bits of the sequence received and then effects a confirmation primary interrogation ERAL by returning the bits thus processed to the first cell in a new bit sequence.

The primary cell 1 receives this bit sequence at the level of its reception module R1, and compares it with a code stored in the primary memory M1. If the comparison is successful, said module MC1 then extracts the code C1 contained in the primary memory M1 and communicates it to the transmitter part E1 of its reception/transmission module so that the former forwards it using waves in the form of a confirmation primary response ERA1 to the interrogator unit OI. The latter receives ERAL and stores in its memory OIM1 the representation C'1 of the first code C1 which it has just received.

This primary interrogation with two sub-steps makes it possible to limit appreciably the attempts at electronic fraud on the primary cell.

When the duration of the timeout has elapsed, the primary control module MC1 switches from the operating state to the standby state.

If the strength of the signal of the carrier is not sufficient, and/or if the primary cell 1 does not recognize the carrier, and/or if the primary response ERB1 and/or ERAL is incomplete, the interrogator unit OI stores a first specific code CS1 in its memory OIM1.

The control module MCOI then orders the transmitter part OIE2 of the second transmission/reception module to transmit a secondary interrogation EIB2 toward the secondary cell 2. This secondary interrogation EIB2 is of the same type as that effected in respect of the basic primary interrogation of the primary cell 1. Similarly, if the strength of the signal of the carrier is sufficient and if the secondary control module MC2 recognizes the carrier within a given time span, then said secondary control module MC2 passes from the standby state to the operating state, this implementing a timeout circuit. The secondary cell 2 then has a second predetermined duration in which to respond.

Said secondary control module MC2 then instructs the processing module MT2 to extract the second code C2 contained in the secondary memory M2-2. Said processing module MT2 then inserts the 16 bits of the second code C2 into a first bit sequence, at a first predetermined location which will serve subsequently. This first sequence is forwarded to the transmitter part E2 of the reception/transmission module which forwards it using waves in the form of a secondary response ERB2 to the interrogator unit OI. The latter receives ERB2 and stores the first bit sequence which it contains in its memory OIM2, this bringing step b) to an end.

To effect this secondary interrogation, the interrogator unit OI also contains a timeout of specified duration. Thus, in the event of the exceeding of said duration, or of non-complying secondary response ERB2, said interrogator unit OI triggers an alarm.

Conversely, if the primary and secondary interrogations are effected within the allotted time span, the procedure continues normally with step c).

Step c):

The control module MCOI instructs the processing module MTOI to extract the second code C2 of 16 bits of the first bit sequence, which is contained in the memory OIM2. The bits of this code are then permuted and then 8 bits C'2 for example are extracted from the 16 bits thus permuted, according to a predetermined protocol.

These 8 bits C'2 are then inserted at a second location predetermined by the first location of the first sequence, accompanied by the first representation FR1 of the first code C1 stored in the memory OIM1, into a second bit sequence which moreover contains a command area corresponding to a given transaction. The 8 bits C'2 and the first representation of the first code then form a second representation SR2 of the first and second codes.

The second sequence is then forwarded to the transmitter part OIE2 of the second transmission/reception module which forwards it using waves in the form of a complementary interrogation EIC. This terminates step c).

Step d):

On reception of EIC, the secondary control module MC of the secondary cell 2 forwards the second bit sequence to the processing module MT2 which, depending on a predetermined processing of the 8 bits C' and on their placement within the second sequence, generates a third C"2, which it compares with the second C2 stored in the secondary memory M2-2. Next, said processing module MT2 compares the second representation C'1 of the first code with the representation of this first code, which latter is stored in the secondary memory M2-1. This terminates step d).

Step e);

If the two comparisons are successful, the processing module MT2 can effect the transaction which is contained in the command area of the second sequence.

To do this, said module generates a third bit sequence which it forwards to the transmitter part E2 of the reception/ transmission module which forwards it using waves in the form of a complementary response ERC to the interrogator unit OI. After this transmission, if the second predetermined duration has elapsed, the secondary control module MC2 switches from the operating state to the standby state.

On reception of the complementary response ERC, the control module of the interrogator unit OI can either display the response to the transaction on a screen, or communicate said response to a central station. This brings the procedure to an end.

Conversely, if the second response received does not comply, or if it contains a specific code CS1 indicating that a primary or secondary interrogation has not succeeded, then step e) is modified as indicated below.

The processing module MT2 of the secondary cell 2 increments an incrementation counter CI which it contains and which is set to zero after each successful transaction.

If the value of the counter CI is less than a chosen number N, for example 3, then said processing module MT2 forwards a command code to the transmitter part E2 of the reception/transmission module, which it then forwards using waves in the form of a command complementary response ECO to the interrogator unit OI. This command code orders the command module OIMC to recommence completely the procedure at step b).

The new procedure will be able to be performed at other frequencies than the procedure which has just run. This extra protection makes it possible to strengthen further the protection against attempts at electronic jamming.

As soon as the value of the incrementation counter is greater than or equal to N, the processing module MT2 of the secondary cell 2 forwards an alarm code to the transmitter part E2 of the reception/transmission module, which it forwards using waves in the form of an alarm complementary response ERCA to the interrogator unit OI which goes automatically into an alarm state. Such an alarm can be displayed either on the screen of the interrogator unit OI or be forwarded to a central station.

At the same time, the control module MC2 of the secondary cell 2 switches from the operating state to the standby state so as to avoid profitless consumption of the battery which it contains in the event of malfunctioning of one of the elements making up the device.

Of course, in the event of the transmission of an alarm code ERCA, it is possible to envisage the control module MC2 not switching immediately after transmission, but continuing to transmit its alarm code for a predetermined duration.

Similarly, on reception of an alarm code, it is possible to envisage, for security reasons, a new interrogation of one at least of the cells so as to avoid triggering the alarm in the event of the momentary malfunctioning of one of the constituent elements of the device, or of poor reception of an interrogation by one of the cells 1 or 2, or of a response by the interrogator unit OI.

In this event, the alarm would be triggered only after confirmation by the secondary cell of its alarm code.

The interrogator unit OI may either be fixed or portable. Thus, it is possible to envisage providing the forces of law and order with portable interrogator units, which would allow them to interrogate a suspect vehicle at any time, on command or simply on presumption. A fixed interrogator unit could be installed at a great number of vehicle transit locations, such as for example motorways, car parks, customs posts.

Figure 4:
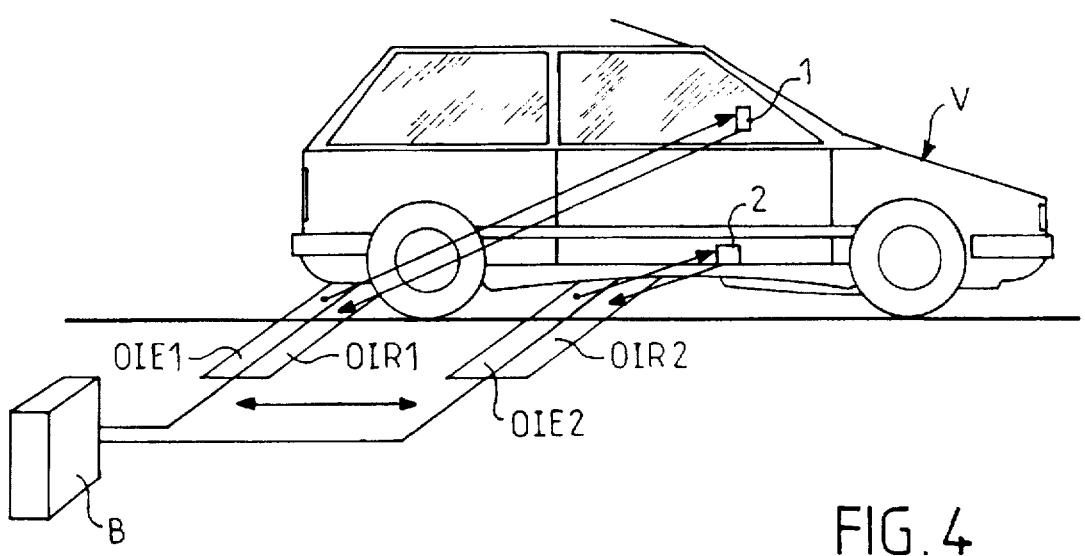
FIG. 4 is a basic diagram of a fixed device also implementing the invention.

Such a fixed interrogator unit can readily be made since it can be divided into several elements as illustrated in FIG. 4, where said interrogator unit comprises a package B housing the processing and control modules, and the memories, and is connected to two transmission/reception modules OIE1-OIR1 and OIE2-OIR2 installed under a motor vehicle transitway.

This type of fixed device requires relatively low transmission powers, unlike a portable interrogator unit, since the possibility of spacing apart the transmission/reception modules makes it possible appreciably to restrict the range of their field of action.

In a configuration or |sic| the interrogator units are all fixed, it is quite obvious that in the event of an unsuccessful procedure upon a first interrogation by an interrogator unit, the second verification interrogation will be effected by the following interrogator unit, which will be warned by the alarm code transmitted by the secondary cell continuously or repetitively.

The memories M1 and M2 of the device according to the invention being rewritable, the codes which they contain can therefore be modified at any time, and according to a given protocol, by an interrogator unit OI. This makes it possible effectively to combat attempted thefts of files of codes.

Moreover, the fast rate of the interrogations/responses allows the device to interrogate objects moving at speeds of perhaps up to around 250 km/h.

However, whereas such a device is particularly apt for the control of moving objects, it can perfectly well be used on fixed objects.

The present invention shall not be limited to the frequencies described above. All other permitted frequencies may be envisaged on condition that they permit sufficient data flow rates between the installed cells and the interrogator unit.

Similarly, the duration of the timeouts being remotely modifiable, it is possible to envisage effecting the interrogation of an object of the motor vehicle type in several steps, one among them being carried out by a first interrogator unit at a first location when the object is in motion, the other being carried out by a second interrogator unit at a second location different from the first, when the object is stationary.

Moreover, in certain applications, as for example car park or motorway tolls, provision may be made to equip the interrogator unit with a metal detector suitable for informing it that it should trigger the interrogation procedure automatically.

Finally, units of the infrared and/or seismic sensor type may be provided in the primary cell, so as to deliver information on the state of operation of the object in or on which the cells are housed.

I claim:

1. Device for the telecontrol of an object (V), of the type comprising an interrogator unit (OI) capable of effecting a primary interrogation using waves (EIB1, EIA1) so as selectively to interrogate at least one primary receiver/transmitter cell (1) housed in or on said object (V) and containing in primary storage means (M1) a first code (C1), and of receiving using waves from said primary cell (1) a primary response (ERB1, ERA1) able to represent a part at least of this first code, characterized in that it furthermore comprises at least one secondary receiver/transmitter cell (2) housed in or on said object (V) and containing in secondary storage means (M2) a second code (C2) and a first representation (FR1) of a part at least of the first code (C1), and capable of transmitting, in response to a secondary interrogation (EIB2), a secondary response (ERB2) able to represent a part at least of this second code (C2), as well as of transmitting, after a primary interrogation of the primary cell (EIB1, EIA1) and a secondary interrogation of the secondary cell (EIB2), at least one complementary response (ERC) in response to a complementary interrogation (EIC) effected by the interrogator unit (OI), said complementary interrogation (EIC) containing a second representation (SR2) of a part at least of the first and second codes transmitted respectively by said primary (1) and secondary (2) cells in response to the primary and secondary interrogations (EIB1, EIA1 and EIB2), this allowing the secondary cell (2) to effect a complementary response (ERC) depending on the primary and secondary responses of the primary (1) and secondary (2) cells, respectively.

2. Device according to claim 1, characterized in that the transmission/reception links between the interrogator unit (OI) and the primary (1) and interrogator unit (OI) and the primary (1) and secondary (2) cells are effected on frequencies which are at least in part distinct.

3. Device according to claim 2, characterized in that the transmission/reception links are effected on at least four distinct frequencies, this allowing the interrogator unit (OI) to store selectively the part at least of the first and second codes transmitted by the primary (1) and secondary (2) cells in response to the primary and secondary interrogations (EIB1, EIA1 and EIB2), depending on the frequency of transmission of the responses of each cell.

4. Device according to claim 1, characterized in that the complementary interrogation (EIC) furthermore comprises a command area which includes a command to execute a "transaction", and in that in the event of absence of response of one at least of the primary (1) and secondary (2) cells, the second representation (SR2) of the part at least of the absent code is replaced with a specific code (CS1) declaring absence of said absent cell.

5. Device according to claim 4, characterized in that the secondary cell (2) furthermore comprises processing means (MT2) capable of comparing the codes of the primary and secondary cells, contained in its secondary storage means (M2-1 and M2-2), with the second representation (SR2) of the parts at least of the respective codes of the primary and secondary cells included within the complementary interrogation (EIC).

6. Device according to claim 5, characterized in that in the event of successful comparison with the codes contained in said secondary storage means (M2), the secondary cell (2) is capable of executing the transaction.

7. Device according to claim 5, characterized in that in the event of at least partially unsuccessful comparison, the secondary cell (2) is capable of transmitting a command complementary response (ERCO) suitable for instructing the interrogator unit (OI) to recommence at least once the primary and secondary interrogations (EIB1, EIA1 and EIB2) of the primary (1) and secondary (2) cells, and in that the secondary cell (2) furthermore comprises an incrementation counter (CI) which can be incremented during each partial or otherwise comparison made.

8. Device according to claim 7, characterized in that the number of permitted incrementations of the counter (CI) is predetermined, and in that the secondary cell (2) is also capable, in the event of the exceeding of the predetermined number, of transmitting an alarm complementary response (ERCA).

9. Device according to claim 4, characterized in that the primary (M1) and secondary (M2) storage means are rewritable.

10. Device according to claim 9, characterized in that the interrogator unit (OI) is also capable of modifying on command the first code (C1) contained in the primary storage means (M1) and its first representation (FR1) in the secondary storage means (M2-1), and/or the second code (C2) contained in the secondary storage means (M2-2).

11. Method for the telecontrol of an object, in which:

a) the object (V) is furnished with at least one primary receiver/transmitter cell (1) housed in or on said object (V) and containing in primary storage means (M1) a first code (C1), and capable of transmitting a primary response (ERB1, ERA1) in response to a primary interrogation (EIB1, EIA1), b) a primary selective interrogation using waves of this primary cell (1) is undertaken, and a primary response (ERB1, ERA1) able to represent a part at least of the first code (C1) is received from said primary cell (1), characterized in that:

in step a), there is provided at least one secondary receiver/transmitter cell (2) housed in or on said object (V) and containing in secondary storage means (M2-1 and M2-2) a second code (C2) and a first representation (FR1) of a part at least of the first code (C1), said secondary cell (2) being capable of transmitting a secondary response (ERB2) in response to a secondary interrogation (EIB2) effected by an interrogator unit (OI), and at least one complementary response (ERC) in response to a complementary interrogation (EIC) effected by said interrogator unit (OI), in step b) a secondary selective interrogation using waves of the secondary cell (2) is undertaken, and a secondary response (ERB2) able to represent a part at least of the second code (C2) is received from said secondary cell (2), and in that it furthermore comprises:

a step c) in which there is transmitted to the secondary cell (2) a complementary interrogation (EIC) containing a second representation (SR2) of a part at least of the first and second codes transmitted by said primary and secondary cells in step b), a step d) in which the secondary cell (2) compares the second code (C2) and the first representation (FR1) of the first code, which are contained in its secondary storage means (M2-2 and M2-1), with the second representation (SR2) of the parts at least of the respective codes of the primary and secondary cells which are included within the complementary interrogation (EIC) transmitted in step c), and a step e) in which the secondary cell (2) transmits at least a complementary response (ERC) as a function of the complementary interrogation (EIC) received in step c).

12. Method according to claim 11, characterized in that there is provided in the complementary interrogation (EIC) a command area which includes a command to execute a "transaction", and in that in the event of absence of response of one at least of the primary (1) and secondary (2) cells, the second representation (SR2) of the part at least of the absent code is replaced with a specific code (CS1) declaring absence of said absent cell.

13. Method according to claim 11, characterized in that in the event of at least partially unsuccessful comparison in step d), there is provision to recommence at least once steps b) to d), and to increment an incrementation counter (CI) housed in the secondary cell (C2).

14. Method according to claim 13, characterized in that the number of permitted repetitions of steps b) to d), in the event of at least partially unsuccessful comparison, is predetermined, and in that in the event of the exceeding of said predetermined number, there is provision for the secondary cell (2) to transmit an alarm complementary response (ERCA), this making it possible to warn an interrogator unit (OI) only in the event of confirmation of non-success of steps b) to d).

15. Method according to claim 11, characterized in that in step b), the primary interrogation comprises a basic primary interrogation (EIB1) and a confirmation primary interrogation (EIA1), and the primary response comprises a basic primary response (ERB1) of the primary cell (1) so as to respond to a basic primary interrogation (EIB1) and a confirmation primary response (ERB1) of the primary cell (1) so as to respond to a confirmation primary interrogation (EIA1).

16. Method according to claim 15, characterized in that the basic primary response (ERB1) is able to represent a part at least of the first code (C1) of the primary cell (1), and in that the confirmation primary interrogation (EIA1) comprises at least one code able to represent the part at least of the code contained in the basic primary response (ERB1), and in that the confirmation primary response (ERA1) is able to represent a part at least of the first code (C1) of the primary cell (1).

* * * * *